(12) United States Patent
Schroeder et al.

(10) Patent No.: US 6,206,458 B1
(45) Date of Patent: Mar. 27, 2001

(54) VEHICLE BODY STRUCTURE

(75) Inventors: Del C. Schroeder, Bloomfield Hills; Suresh Nagesh, West Bloomfield; John G. Argeropoulos, Sterling Heights, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/395,683

(22) Filed: Sep. 13, 1999

(51) Int. Cl.[7] .................................................. B60J 7/00
(52) U.S. Cl. .......................... 296/193; 296/901; 296/188; 296/197; 296/183
(58) Field of Search ................................ 296/188, 901, 296/203.01, 203.03, 29

(56) References Cited

U.S. PATENT DOCUMENTS

| | | | |
|---|---|---|---|
| 3,599,575 | * 8/1971 | Yuroski | 296/901 |
| 3,618,693 | * 11/1971 | Graham | 180/93 |
| 3,766,862 | * 10/1973 | Heap et al. | 296/901 |
| 3,868,141 | * 2/1975 | Johnson . | |
| 3,894,608 | * 7/1975 | Haenle | 296/901 |
| 4,290,235 | * 9/1981 | Jahnle et al. . | |
| 4,320,160 | * 3/1982 | Nishimura et al. . | |
| 4,382,626 | * 5/1983 | Spooner . | |
| 4,601,367 | * 7/1986 | Bongers . | |
| 4,732,803 | * 3/1988 | Smith | 296/188 |
| 4,742,899 | * 5/1988 | Thornton . | |
| 4,976,490 | * 12/1990 | Gentle | 293/183 |
| 5,046,778 | * 9/1991 | Larsen . | |
| 5,047,281 | * 9/1991 | Betz et al. . | |
| 5,344,689 | * 9/1994 | Ide et al. . | |
| 5,362,345 | * 11/1994 | Stettler et al. | 296/901 |
| 5,531,500 | * 7/1996 | Podvin . | |
| 5,552,208 | * 9/1996 | Lin et al. . | |
| 5,660,427 | * 8/1997 | Freeman et al. . | |
| 5,704,644 | * 1/1998 | Jaggi . | |
| 5,857,732 | * 1/1999 | Ritchie . | |
| 5,934,745 | * 8/1999 | Moore et al. | 296/197 |

FOREIGN PATENT DOCUMENTS

| | | | | |
|---|---|---|---|---|
| 1007645 | * | 5/1957 | (DE) | 296/188 |
| 4208408 | * | 9/1993 | (DE) | 296/188 |
| 645449 | * | 6/1928 | (FR) | 296/28 |
| 880670 | * | 10/1961 | (GB) | 296/188 |
| 404197879 | * | 7/1992 | (JP) | 296/188 |

* cited by examiner

Primary Examiner—Joseph D. Pape
Assistant Examiner—Kiran B. Patel
(74) Attorney, Agent, or Firm—Kenneth H. Maclean

(57) ABSTRACT

Uni-directional fibers are wrapped in tension around vehicle body panels to place the body panels in compression. A compressive load on the inner body panels, coupled with the actual load on the uni-directional fibers in tension contribute to a vehicle structural body that has increased stiffness.

3 Claims, 3 Drawing Sheets

VEHICLE BODY STRUCTURE

BACKGROUND OF THE INVENTION

1. Field of the Invention

The present invention relates generally to a motor vehicle body, and more particularly to a motor vehicle body of simple, lightweight construction having structural unidirectional fibers overwrapped in tension in order to contribute to the vehicle body stiffness.

2. Background and Summary of the Invention

As the automotive industry explores the use of plastic vehicle structures, it is desirable to provide a method for improving the body stiffness of the plastic vehicle structures without greatly increasing the amount of material and/or weight of the vehicle. The Assignee of the present application has a U.S. application entitled "Motor Vehicle Body", Ser. No. 08/892,461 which discloses a motor vehicle body which includes a left hand inner body panel, a left hand outer body panel, a right hand inner body panel, and a right hand outer body panel. The four body panels are capable of being easily and inexpensively secured together at the longitudinal mid-line of the motor vehicle body. The motor vehicle body disclosed in the above-identified application provides a vehicle body which is lightweight, low cost, and has a minimum number of parts which is easy to manufacture and assemble.

The vehicle body structure of the present invention provides a structural, uni-directional fiber over-wrap of the plastic body panels in order to greatly enhance the physical and crash characteristics of the plastic vehicle structure. The structural uni-directional fibers, which are preferably made from carbon, graphite, KEVLAR, or fiberglass are placed in tension on an injection molded, Sheet Molding Compound (SMC). The structural fiber overwrap is provided in tension and contributes to the overall vehicle structure, thus allowing a lighter vehicle understructure to be used.

According to the principles of the present invention, a vehicle body structure is provided including a vehicle body including sidewall portions, roof portions, and front and rear wall portions. The fiber overwrap is wrapped around the vehicle body in tension. According to one aspect of the present invention, the fiber overwrap is bonded to the vehicle body. The fiber overwrap can include a plurality of thermoplastic coated fibers which are heated prior to application on the vehicle body in order to slightly melt the thermoplastic materials and create the bond between the vehicle body and the fiber overwrap. As an alternative, the fiber overwrap can be bonded to the vehicle body by an adhesive.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
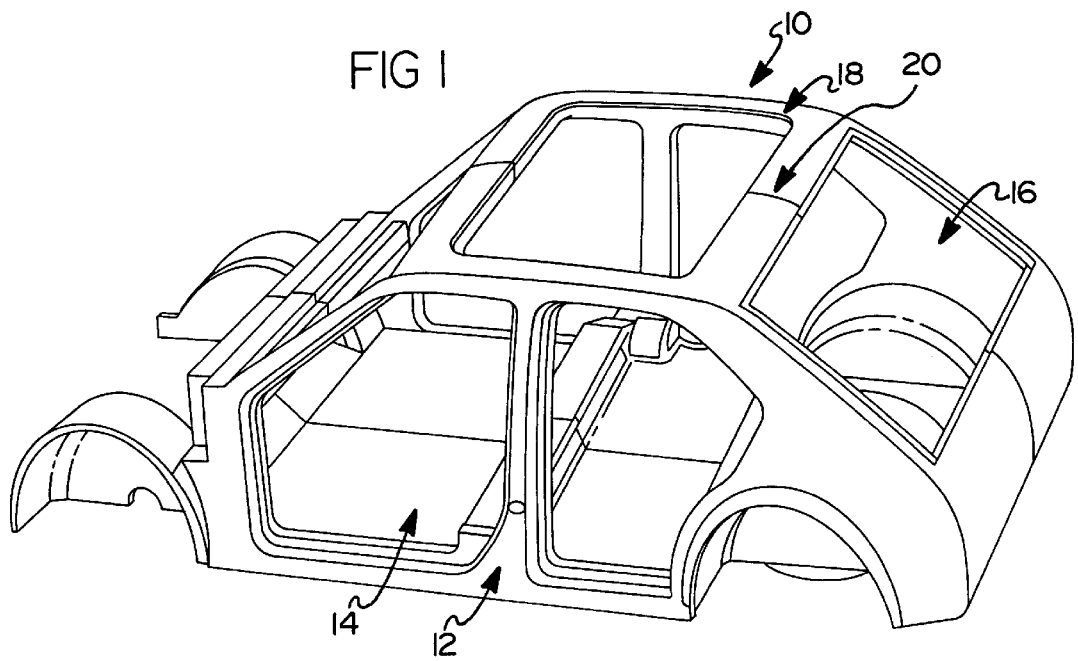
FIG. 1 is a perspective view of a preferred motor vehicle body of the present invention.

A motor vehicle body according to the present invention is shown in FIG. 1 and designated by reference numeral 10. Motor vehicle body 10 may be formed from the four parts which are shown in exploded view in FIG. 2. The four motor vehicle body parts include left hand outer body panel 12, left hand inner body 14, right hand inner body panel 16, and right hand outer body panel 18. The four body panels 12, 14, 16, and 18 are secured together at a longitudinal mid-line of motor vehicle body 10. Longitudinal mid-line 20 is shown in the preferred location, i.e., the center line of the motor vehicle body 10.

Figure 2:
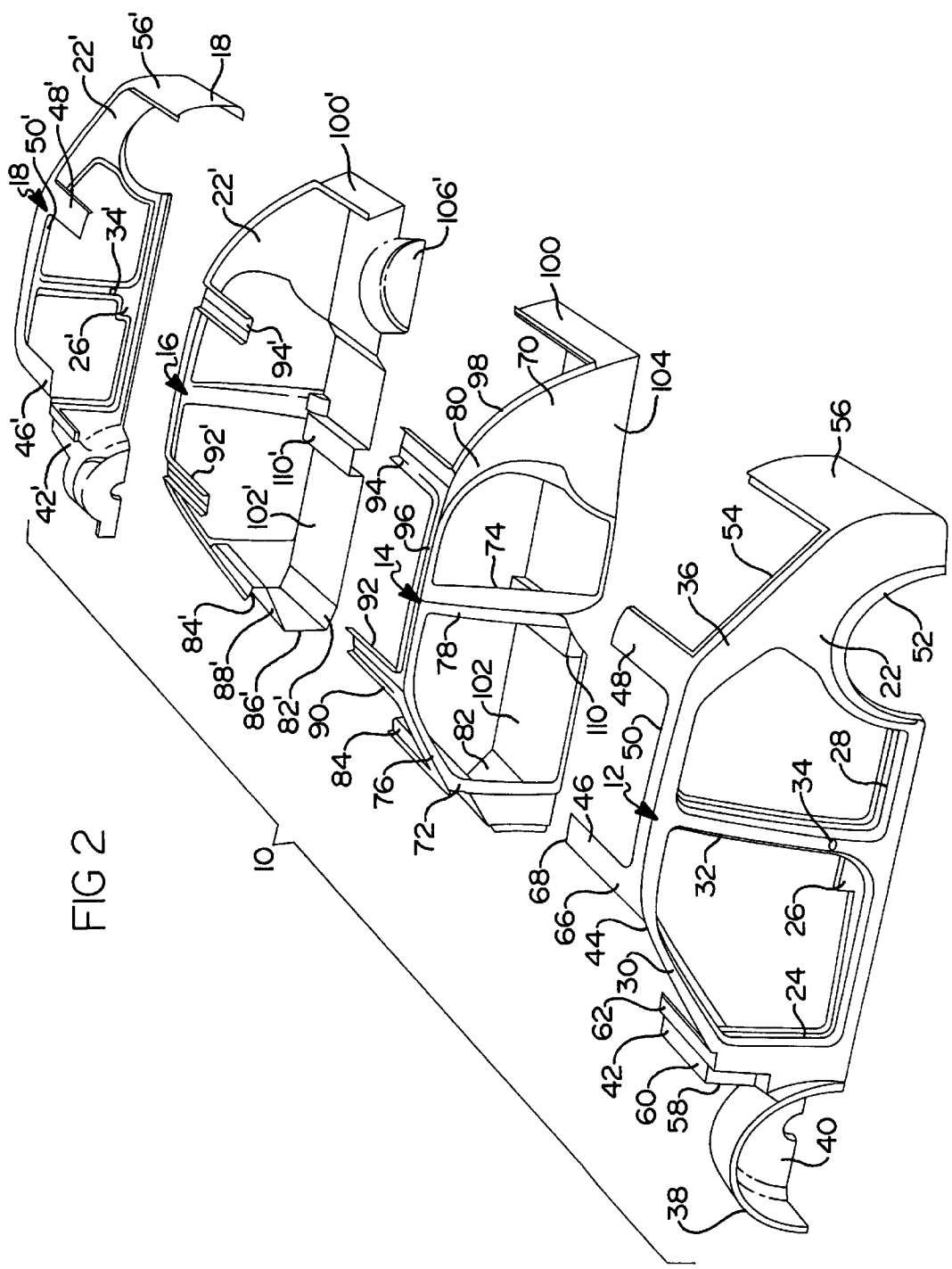
FIG. 2 is an exploded perspective view of the body panels which form the preferred motor vehicle body of FIG. 1.

With reference to FIG. 2, the left hand outer body panel 12 has a generally vertical side 22 which includes front door frame member 24 having tunnel cap 26 therein, back door frame member 28, "A" pillar member 30, "B" pillar member 32 having opening 34 therein, and "C" pillar member 36. Door frame members 24 and 28 also include frames for windows.

Left hand outer body panel 12 also has a front fender liner 38 with inner wheel well 40, plenum box member 42, windshield frame member 44, front header member 46, rear header member 48, roof frame member 50, rear fender 52, back window frame member 54, and back panel member 56. Plenum box member 42 includes vertical wall 58 which joins horizontal wall 60 which, in turn, joins angular wall 62.

Members such as fender liner 38, plenum box member 42, front header member 46, rear header member 48, and back panel member 56 may all be considered horizontal appendages extending from generally-vertical side 22. The appendages each have a proximal end which joins generally-vertical side 22 and a distal end which is opposite the proximal end. For example, the front header member 46 has proximal end 66 and distal end 68.

For reasons which will be discussed hereinbelow, it is preferred that the appendages be tapered circumferentially from their proximal ends to their distal ends. Preferably, the taper is at most about five degrees, and most preferably, the taper is about 1.5 degrees.

Right-hand outer body panel 18 is basically the mirror image of, and has the same features, as left hand outer body panel 12. Some of the features of right hand outer body panel 18 are labeled with the same reference numerals as those for left hand outer body panel 12, but with an apostrophe "'" suffix.

Left-hand inner body panel 14 has generally-vertical side 70 which includes front door frame member 72, back door frame member 74, "A" pillar member 76, "B" pillar member 78, and "C" pillar member 80. Door frame members 72 and 74 also include window frame segments. The exterior of vertical side 70 may include webs to improve the structural stability of the motor vehicle body.

Left-hand inner body panel 14 also has toe pan member 82, dash member 84, windshield frame member 90, front header member 92, rear header member 94, roof frame member 96, back window frame member 98, back panel member 100, floor member 102, rear wheel housing 104, spare tire housing member 106, filler neck housing 108, and front seat support member 110 which is a transverse projection forming transverse tunnel 112 thereunder. As may best be seen on right-hand inner body panel 16, the dash member referenced 84', includes vertical wall 86' and angular wall 88'.

Front header member 92 and rear header member 94 each have a bottom surface and a sidewall extending upwardly from each side of the bottom surface. Front seat support 110 which adds side to side support to motor vehicle body 10 is elevated above floor member 102. When left-hand inner body panel 14 is connected to right-hand inner body panel 16, floor members 102 and 102' form the floor of the motor vehicle body 10. In addition, front seat support member 110 joins front seat support member 110' and extends from generally-vertical left side 22 to generally-vertical right side 22' and forms transverse tunnel 112, 112' thereunder. Transverse tunnel 112, 112' is capped on its end with tunnel caps 26 and 26' and may enclose a gas tank therein. Motor vehicle body 10 as shown in FIG. 2 has two openings, 34 and 34', one in the "B" pillar of each of the outer body panels.

Right-hand inner body panel 16 is basically the mirror image of, and has the same members as, left-hand inner body panel 14. Some of the members of right-hand inner body panel 16 are labeled with the same reference numerals as those used for left-hand inner body panel 14, but with an apostrophe suffix.

The four body panels 12, 14, 16, and 18 are assembled together to form the motor vehicle body 10. The four body panels 12, 14, 16, and 18 may be formed by molding, e.g., injection molding, a polymeric material such as a plastic deposit material. Thus, each body panel is a single piece and all the features shown on each of the body panels in FIG. 2 are integral. Advantageously, the color of the motor vehicle body may be provided by pigmenting the plastic material so that painting will not be required and small chips in the motor vehicle body are not as noticeable as they are in conventional metal motor vehicle bodies. In addition, eliminating the painting process and the manufacturing of the motor vehicle saves on manufacturing costs and eliminates the usual cost of purifying the effluent air from the painting process. Alternatively, the four body panels may be formed primarily of polymeric material with some features, such as the floor members, formed of metal.

Suitable plastic materials for forming the panels include polyester, terephthalate, propylene, and polyolefin rubber/propylene blends. A specific suitable plastic composite material is polyester terephthalate filled with 15 weight percent fiberglass which is available from Hoechst-Celanese, Frankfurt, West Germany.

Being molded, the thickness of the various features of the body panels may be easily controlled as desired. A suitable average thickness is from about two to about five millimeters thick, preferably about three millimeters thick. In contrast, if the body panels and features are stamped from sheet metal, the thickness of the various features is not as easily controlled. In addition, when made from a polymeric material, the weight of the motor vehicle body of the present invention may be lower than traditional vehicle bodies.

The injection molding process typically employs a male and a female mold. The male and female molds are preferably designed to provide a taper in the mold part in the direction from the male mold to the female mold to allow for easy removal of the molds. For this reason, the appendages of the body panels of the present invention are tapered from the generally-vertical sides of the body panels to the ends of the appendages.

Figure 6:
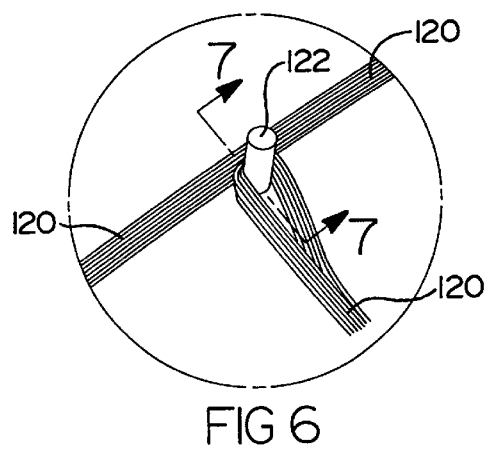
FIG. 6 is a detailed view of the encircled area 6 of FIG. 3, illustrating a spindle around which the fiber overwrap is wrapped.
Figure 7:
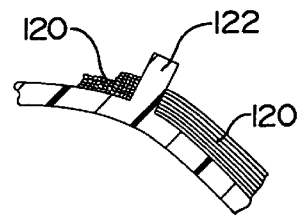
FIG. 7 is a cross-sectional view taken along lines 7—7 of FIG. 6.
Figure 3:
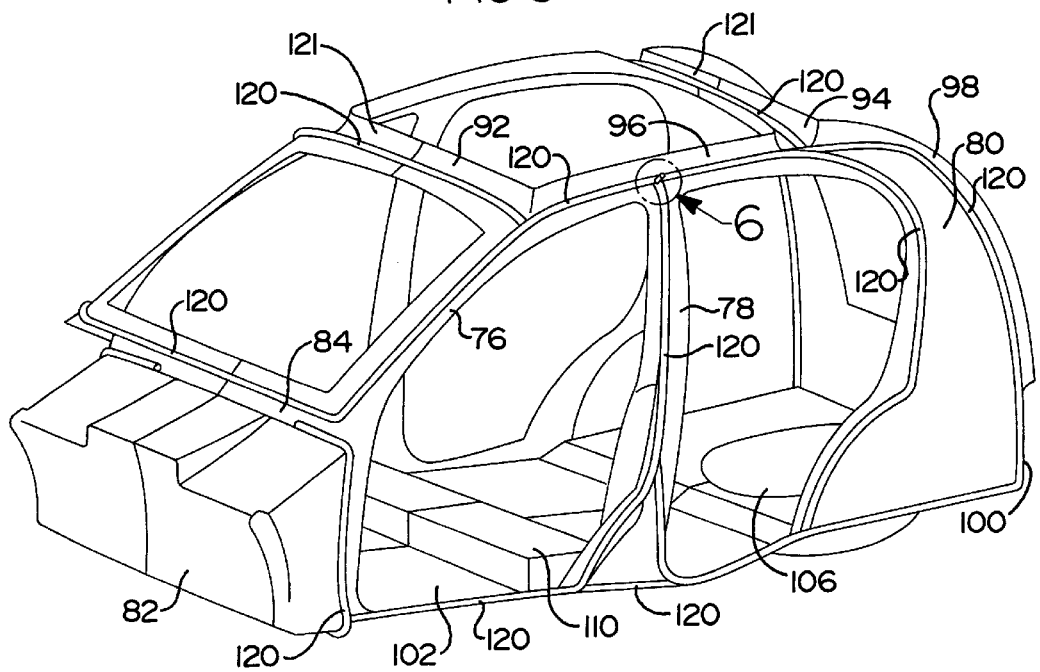
FIG. 3 is a perspective view of the fiber overwrap applied to the inner panels of the vehicle body according to the principles of the present invention.

In order to form the motor vehicle body 10 from the four body panels, the left-hand inner body panel 14 is connected to the right-hand inner body panel 16 by using couplers which are disclosed in U.S. Pat. No. 5,934,745, issued Aug. 10, 1999. Once the couplers are secured to the body panels 14, 16, structural unidirectional fibers 120 are wrapped in tension around the body panels 14, 16. The inner body panels 14, 16 are provided with guide channels 121 or alternatively with pegs 122 (best shown in FIG. 6) integrally formed therein to guide the fiber overwrap around the body structure of panels 14, 16. With reference to FIG. 6, a peg 122 is shown for guiding fibers 120 along the "B" pillar 78. As shown in FIG. 3, the fiber overwrap extends along the roof frame member 96, "A" pillar 76, "B" pillar 78, "C" pillar 80, along dash member 84, front header member 92, rear header member 94, back window frame member 98, back panel member 100, toe pan member 82, floor member 102, and front seat support member 110.

The structural unidirectional fibers 120 placed in tension apply uniform force putting the inner body panels 14, 16 in compression. This compressive load on the inner body panels 14, 16 coupled with the actual load on the unidirectional fibers in tension contribute to a structural plastic body that is on the order of ten times stronger than an injection molded plastic body structure without the fiber overwrap 120. In particular, with a specific test performed, the fiber overwrap added one pound to the weight of the vehicle body but increased the body stiffness by approximately $4^{1/2}$ times. It is believed that with additional windings, the body stiffness can be increased on the order of ten times or more with only a few pounds of added weight.

Figure 4:
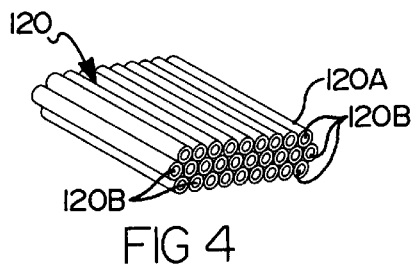
FIG. 4 is a perspective view of a segment of the fiber overwrap including thermoplastic coated fiber.
Figure 5:
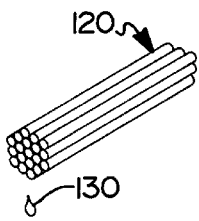
FIG. 5 is a perspective view of a section of a fiber bundle which is used with a wet resin for bonding the fiber overwrap to the vehicle body.

It should be understood by one of ordinary skill in the art, that the winding pattern of the fiber overwrap 120 can be varied in many ways and is adaptable to many vehicle structures having different shapes and sizes. Although disclosed herein in combination with a plastic vehicle body structure, the fiber overwrap 120 can be utilized with vehicle body structures other than plastic. In particular, metal or aluminum body structures could be reinforced with the fiber overwrap 120 of the present invention in order to provided additional stiffness to the vehicle body. In addition, the body panels can be downsized or reduced in thickness and supplemented with fiber overwrap to place the body panels in compression to increase the body stiffness. This would result in vehicle body weight reduction without a corresponding decrease in body stiffness With reference to FIGS. 4 and 5, the fiber overwrap 120 can use either thermoplastic coated fibers as shown in FIG. 4, or wet resin coated fibers as shown in FIG. 5. In the thermoplastic coated fiber process, heat is applied to the fiber overwrap 120 just before the fiber contacts the body surface. As the thermoplastic coating 120A is heated, it softens and when applied to the vehicle body is allowed to cool in order to form a bond between the vehicle body and the fiber overwrap 120. With the wet resin filament wound process as shown in FIG. 5, a thermoset resin material 130 is applied to the fiber overwrap as it is applied to, or after it is applied to, the vehicle body. The preferred materials for the fiber strands 120B of the overwrap includes carbon, graphite, KEVLAR, and fiberglass fibers.

After the inner body panels 14, 16 are secured together, and wrapped by the fiber overwrap as described above, outer body panels 12 and 18 are secured to the inner body panels 14, 16 using methods which are described in corresponding U.S. Pat. No. 5,934,745. After the four body panels have been secured together, all seams may be sealed to prevent leakage between the panels and for aesthetic purposes. A hood panel (not shown) which includes front fenders and a front bumper may now be attached to the motor vehicle body 10. The thus-described hood panel may also be injection molded as one piece. The motor vehicle body may then be attached, e.g., by adhesive and bolts, to a metal vehicle frame, and all auxiliary parts, such as door frames and a top, may be added to the body and frame. Frame members 50, 50', 96, and 96' may be designed so they receive a roll top which may be incorporated therewith. The roof can also be designed to receive a roof panel or the roof panel can be integrally formed with the body panels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body structure, comprising:
   a vehicle body including sidewall portions, roof portions and front and rear wall portions; and
   a fiber overwrap wrapped around said vehicle body in tension, wherein said fiber overwap is bonded to said vehicle body.

2. The vehicle body structure according to claim 1, wherein said fiber overwrap includes a plurality of thermoplastic coated fibers which are heated prior to application on the vehicle body in order to create a bond between said vehicle body and said fiber overwrap.

3. The vehicle body structure according to claim 1, wherein said fiber overwrap is bonded to said vehicle body by an adhesive.

* * * * *